United States Patent
Chen et al.

(10) Patent No.: US 12,190,049 B2
(45) Date of Patent: Jan. 7, 2025

(54) DOCUMENT PROCESSING METHOD, APPARATUS AND DEVICE, AND MEDIUM

(71) Applicant: BEIJING ZITIAO NETWORK TECHNOLOGY CO., LTD., Beijing (CN)

(72) Inventors: Wei Chen, Beijing (CN); Guangping Xie, Beijing (CN); Xuejia Chen, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/458,673

(22) Filed: Aug. 30, 2023

(65) Prior Publication Data
US 2023/0409813 A1    Dec. 21, 2023

Related U.S. Application Data

(63) Continuation of application No. PCT/CN2022/078526, filed on Mar. 1, 2022.

(30) Foreign Application Priority Data

Mar. 1, 2021 (CN) .......................... 202110227791.1

(51) Int. Cl.
G06F 40/166    (2020.01)
G06F 3/0484    (2022.01)

(52) U.S. Cl.
CPC .......... *G06F 40/166* (2020.01); *G06F 3/0484* (2013.01)

(58) Field of Classification Search
CPC ..................................................... G06F 40/166
See application file for complete search history.

(56) References Cited

U.S. PATENT DOCUMENTS

| 9,703,763 | B1 | 7/2017 | Zemach |  |
|---|---|---|---|---|
| 2003/0229858 | A1* | 12/2003 | Keophane et al. | G06F 17/00 |
| 2004/0073872 | A1* | 4/2004 | Yatovsky et al. | G06F 17/00 |
| 2009/0234882 | A1 | 9/2009 | Ota et al. | |
| 2009/0300522 | A1* | 12/2009 | Haynes et al. | G06F 3/048 |
| 2010/0058176 | A1* | 3/2010 | Carro et al. | G06F 17/21 |

(Continued)

FOREIGN PATENT DOCUMENTS

| CN | 101278283 A | 10/2008 |
|---|---|---|
| CN | 104765849 A | 7/2015 |

(Continued)

OTHER PUBLICATIONS

International Search Report and Written Opinion, International Patent Application No. PCT/CN2022/078526, May 11, 2022, with English translation of Search Report (12 pages).

(Continued)

*Primary Examiner* — James J Debrow
(74) *Attorney, Agent, or Firm* — Astute IP Law Group

(57) ABSTRACT

Provided are a document processing method, device, and a medium. The method comprises: receiving, in a first document, an instruction for inserting a content block, wherein the content block belongs to a second document; and displaying, in the first document, information of the second document and information of the content block, wherein the content block is preset by online document software, or is set by a user in a customized manner.

16 Claims, 3 Drawing Sheets

Receive, in a first document, an instruction for inserting a content block — S110

Display, in the first document, information of the second document and information of the content block — S120

(56) References Cited

U.S. PATENT DOCUMENTS

| | | | |
|---|---|---|---|
| 2011/0107200 A1* | 5/2011 | Roger et al. ............ | G06F 17/22 |
| 2017/0220567 A1 | 8/2017 | Masson et al. | |
| 2019/0220539 A1 | 7/2019 | Taylor et al. | |
| 2023/0153546 A1* | 5/2023 | Peleg et al. ............ | G06F 40/56 |

FOREIGN PATENT DOCUMENTS

| | | |
|---|---|---|
| CN | 106445321 A | 2/2017 |
| CN | 108292302 A | 7/2018 |
| CN | 110633159 A | 12/2019 |
| CN | 111078655 A | 4/2020 |
| CN | 111602120 A | 8/2020 |
| CN | 112328853 A | 2/2021 |
| JP | 2009516236 A | 4/2009 |
| JP | 2009223675 A | 10/2009 |

OTHER PUBLICATIONS

Office Action issued in Chinese Patent Application No. 202110227791. 1, Feb. 23, 2024, with English translation (14 pages).
Notice of Reasons for Refusal for Japanese Patent Application No. 2023-552528, mailed Oct. 22, 2024, 6 pages.

\* cited by examiner

DOCUMENT PROCESSING METHOD, APPARATUS AND DEVICE, AND MEDIUM

This application is a continuation application of International Application No. PCT/CN2022/078526, filed on Mar. 1, 2022, which claims priority to Chinese Patent Application No. 202110227791.1, titled "DOCUMENT PROCESSING METHOD, APPARATUS AND DEVICE, AND MEDIUM", filed on Mar. 1, 2021 with the China National Intellectual Property Administration, both of which are incorporated herein by reference in entireties.

FIELD

The present disclosure relates to the technical field of data processing and in particular to a method, apparatus and document processing device and a medium.

BACKGROUND

With the continuous development of technology, electronic documents are widely used. When the user copies a part of the content of one document to another document, the following operations can be performed: the user opens the source document, finds the part of the content that is needed, and then copies it; subsequently, opens the target document, and paste it in the target document. By doing so, the function of adding the part of content in the target document is completed. However, from the perspective of the user, it is difficult to trace the source of the copied content in the target document.

SUMMARY

A method, apparatus and document processing device and a medium are provided according to the embodiments of the present disclosure, which can enable a user to intuitively understand the reference relationship between a content block and a source document in a first document.

In a first aspect, a method for document processing is provided according to the present disclosure. The method includes:

receiving, in a first document, an instruction for inserting a content block, where the content block belongs to a second document; and displaying, in the first document, information of the second document and information of the content block; where, the content block is preset by online document software; or the content block is customized by a user.

In a second aspect, a document processing apparatus is further provided according to the present disclosure. The apparatus includes:

a receiving module, configured to receive, in a first document, an instruction for inserting a content block, where the content block belongs to a second document; and a first display module, configured to display, in the first document, information of the second document and information of the content block; where, the content block is preset by online document software; or the content block is customized by a user.

In a third aspect, a document processing device is further provided according to the present disclosure. The document processing device includes:

one or more processors; and a memory, configured to store one or more programs;

where, the one or more programs, when executed by the one or more processors, cause the one or more processors to implement the method for document processing according to any one of the embodiments of the present disclosure.

In a fourth aspect, a medium is further provided according to the present disclosure. The medium storing a computer program thereon, where the computer program, when executed by a processor, implements the method for document processing according to any one of the embodiments of the present disclosure.

BRIEF DESCRIPTION OF THE DRAWINGS

In conjunction with the drawings and with reference to the following embodiments, the above and other features, advantages and aspects of the embodiments of the present disclosure are more apparent. The same or similar reference numerals represent the same or similar elements. It should be understood that the drawings are schematic and the components and elements are unnecessarily drawn to scale.

DETAILED DESCRIPTION OF EMBODIMENTS

Figure 1:
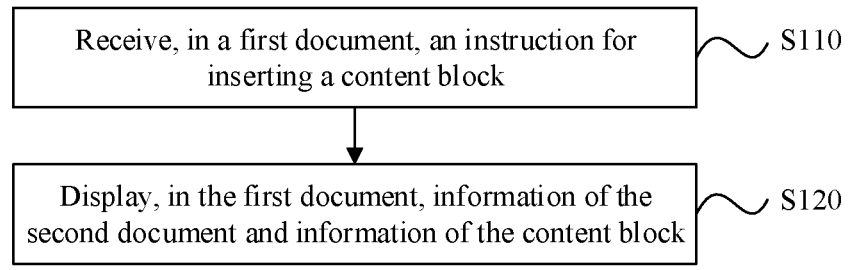
FIG. 1 is a flowchart of a method for document processing according to an embodiment of the present disclosure.

The embodiments of the present disclosure are described in detail below with reference to the drawings. Although some embodiments of the present disclosure are shown in the drawings, it should be understood that the present disclosure may be implemented in various forms and should not be limited to the embodiments described herein. The embodiments are provided for thoroughly and completely understanding the present disclosure. It should be understood that the drawings and the embodiments of the present disclosure are exemplary and are not intended to limit the protection scope of the present disclosure.

It should be understood that the steps in the method embodiments of the present disclosure may be performed in different orders and/or in parallel. In addition, the method embodiments may include an additional step and/or a step shown herein may be omitted. The scope of the present disclosure is not limited in this aspect.

The term "include" and its variations in the present disclosure means open-ended inclusion, i.e., "including but not limited to". The term "based on" means "based at least in part on". The term "one embodiment" means "at least one embodiment". The term "another embodiment" means "at least one additional embodiment". The term "some embodiments" means "at least some embodiments". The definitions of other terms are provided in the following descriptions.

It should be noted that the wordings such as "first" and "second" used in the present disclosure are used to distinguish different apparatuses, modules or units, and are not used to limit a sequential order or interdependence of the functions performed by the apparatuses, modules or units.

It should be noted that the wordings such as "one" and "multiple" used in the present disclosure are illustrative and not restrictive. Those skilled in the art should understand that the wordings should be understood as "one or more" unless otherwise expressly indicated in the context.

The names of messages or information exchanged between multiple apparatuses in the embodiments of the present disclosure are only for illustrative purposes, and are not intended to limit the scope of the messages or information.

In one embodiment, FIG. 1 illustrates a flowchart of a method for document processing according to an embodiment of the present disclosure. This embodiment is applicable to the case where a reference relationship between a content block and a source document is intuitively displayed in a first document. The method may be implemented by a document processing apparatus, which may realize by software and/or hardware. The method for document processing is applied to a document processing device. Exemplarily, the document processing device may be a computer device.

It should be noted that the method for document processing provided in this embodiment may specifically be used in a computer device, and may specifically be considered to be implemented by a document processing apparatus integrated in the computer device. The computer device may specifically include a computer device including a processor, a memory, an input apparatus and an output apparatus. As an example, it may be a laptop, a desktop computer, a tablet computer and a smart terminal and the like.

As shown in FIG. 1, the method for document processing according to the present disclosure mainly includes steps S110 and S120 as follows.

In S110, an instruction for inserting a content block is received in a first document.

The content block belongs to a second document. In an embodiment, the first document may be an editable document displayed on a display interface of the document processing device. In practical operation, the type of the first document is not limited. Exemplarily, the first document may be any editable document such as a Word document, a txt document, an Excel document and a PDF document. The content block is data with independently coordinating and recording capacities. The definition of content block may be preset by online document software, or may be customized by users. For example, content blocks can be distinguished by content types, such as texts, pictures, tables and the like. The content blocks may alternatively be distinguished based on preset separators, such as a "carriage return", "paragraph separator", and "section break" and so on. The separation boundary of content blocks may also be set by user operations.

The content block belongs to the second document. It can be understood that the content block in the second document is referenced in the first document. In an embodiment, the content block in the second document is inserted into the first document. In the practical operation process, the content block in the second document can be inserted into the first document only in the case that the user is determined to have reference permission (reading permission and sharing permission) and editing permission for the source document of the content block.

In S120, information of the second document and information of the content block are displayed in the first document.

In an embodiment, the information of the second document includes one of the following: a title of the second document; a tag of the second document; information of a content block in the second document. In an embodiment, the title of the second document refers to the subject name of the second document; the tag of the second document may be keywords or descriptive information extracted based on the content in the second document. Apparently, the information of the second document may be represented directly by the information of one of the content blocks in the second document.

In an embodiment, after receiving, in the first document the insertion, instruction for a content block, the information of the second document and the information of the content block are displayed in the first document. It should be noted here that displaying, in the first document, the information of the second document may be understood as displaying, in the first document, the reference source of the content block (i.e., the information of the second document). Correspondingly, displaying, in the first document, the information of the content block may be understood as displaying the referenced content block in the first document.

In the technical solution of this embodiment, after receiving in the first document the instruction for inserting the content block, the information of the second document and the information of the content block are displayed in the first document. In this way, the user can intuitively understand from the first document the reference relationship between the content block and the source document, to elevate the usage convenience for the user.

Figure 2:
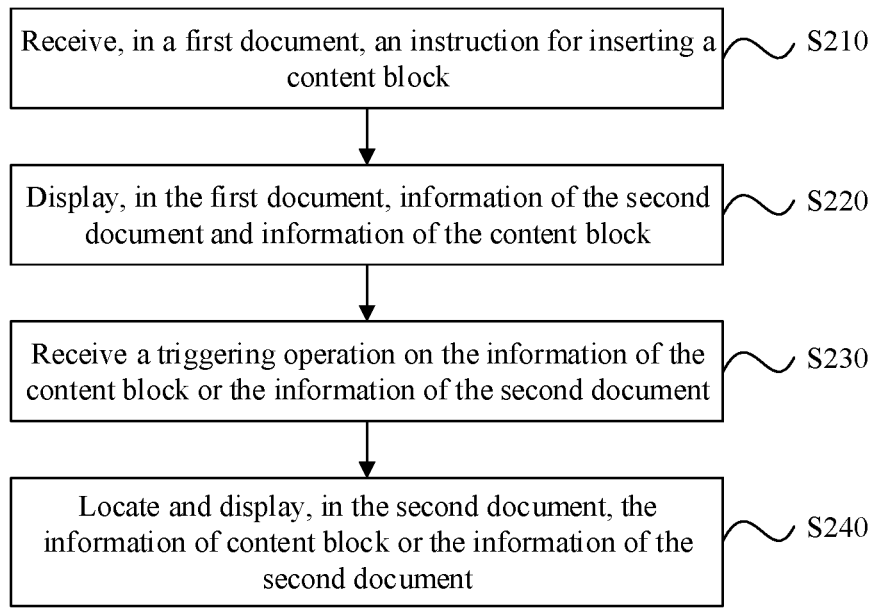
FIG. 2 is a flowchart of a method for document processing according to another embodiment of the present disclosure.

FIG. 2 is a flowchart of a method for document processing according to another embodiment of the present disclosure. This embodiment further describes the method for document processing on the basis of the foregoing embodiments. As shown in FIG. 2, the method for document processing in this embodiment includes steps S210 to S240 as follows.

In S210, an instruction for inserting a content block is received in a first document.

The content block belongs to the second document.

In S220, information of the second document and information of the content block are displayed in the first document.

In an embodiment, step S220 specifically includes: displaying, in the content block of the first document or in an associated area of the content block of the first document, the information of the second document. In the first document, by displaying the information of the second document and the information of the content block in the content block of the first document or in the associated area of the content block, it shows that the content block is not originated from the first document but is referenced from another document (such as the second document). Correspondingly, while displaying the information of the content block, the reference source of the content block is displayed. The associated area of the content block refers to the area surrounding the content block.

Figure 3:
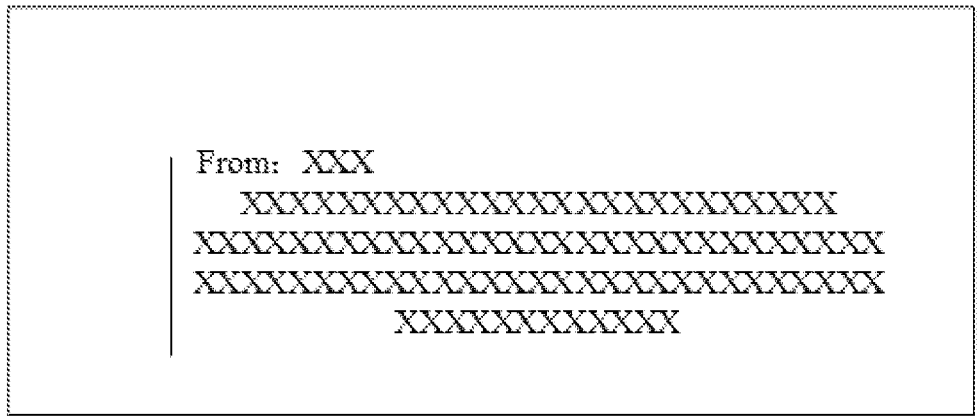
FIG. 3 is a schematic display of information of a content block and information of a second document according to an embodiment of the present disclosure.

In an embodiment, step S220 specifically includes: displaying the information of the content block and/or the information of the second document in the first display mode. In the first document, by displaying the information of the content block in the first display mode, it shows that the content block is not originated from the first document but is referenced from another document (such as the second document). While displaying the information of the content block, the information of the second document may also be displayed to display the reference source of the content block. Exemplarily, FIG. 3 is a schematic display of information of a content block and information of a second document according to an embodiment of the present disclosure. As shown in FIG. 3, a vertical line on the left is used to indicate that the content block is reference content, rather than the content originated from the first document. And, "From XXX" is displayed above the content block as the reference source of the content block, so that users can intuitively view the reference source of the content block.

In S230, a triggering operation on the information of the content block or the information of the second document is received.

In an embodiment, the triggering operation on the information of the content block or the information of the second document refers to the clicking operation on the information of the content block or the information of the second document. Alternatively, it may be a focus operation on the information of the content block or the second document.

In S240, the information of content block or the information of the second document are located and displayed in the second document.

In the embodiment, after receiving the triggering operation on the information of the content block or the information of the second document, the second document pops up on the display interface of the first document, and a positioning mark of the content block information is located to the content block information or the information of the second document. In practical operation, the mouse cursor may be located on the content block information in the second document, or be directly located on the information of the second document. It can be understood that the information of the second document and the information of the content block may be interactive, that is, after receiving a clicking operation on the information of the second document or the information of the content block, the second document is automatically opened and jumped to the position where the information of the content block or the information of the second document is in the second document.

Figure 4:
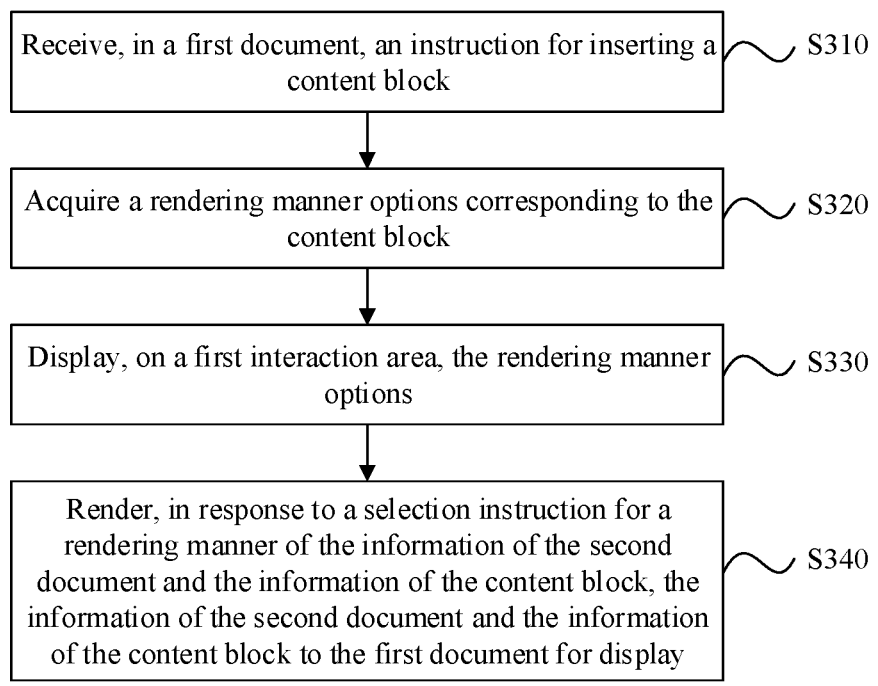
FIG. 4 is a flowchart of a method for document processing according to yet another embodiment of the present disclosure.

FIG. 4 is a flowchart of a method for document processing according to yet another embodiment of the present disclosure. This embodiment further describes the method for document processing on the basis of the foregoing embodiments. As shown in FIG. 4, the method for document processing in this embodiment includes steps S310 to S340 as follows.

In S310, an instruction for inserting a content block is received in a first document.

The content block belongs to the second document.

In S320, rendering manner options corresponding to the content block are acquired.

In an embodiment, after receiving in the first document the instruction for inserting the content block, the document processing device automatically acquires all rendering manner options corresponding to the content block from its own database. It can be understood that all rendering manner options corresponding to each content block are pre-stored in the document processing device. Apparently, if the first document is an online document, all rendering manner options corresponding to the content block may alternatively be acquired directly from the server corresponding to the document processing device. It should be note that the rendering manner options included in each content block may be the same or different, which is not limited in the present disclosure. In other words, the rendering manner options corresponding to the content block depend on the type or the form of the content block, which can be adjusted according to the type or form of the content block. It can be understood that each content block including the same rendering manner options may mean that: each content block has the same number of rendering manner options; the rendering manners corresponding to the same rendering manner option are the same; or each content block has the same number of rendering manner options and the rendering manners corresponding to the same rendering manner option are the same. It should be noted that one rendering manner option corresponds to one rendering manner, i.e., there is a one-to-one correspondence relationship between the rendering manner option and the rendering manner.

In S330, the rendering manner options are displayed on a first interaction area.

It can be understood that the first interaction area is used to carry and display the rendering manner options of the content block. In an embodiment, after all rendering manner options corresponding to the content block are acquired, the rendering manner options are displayed in the first interaction area according to a preset priority order for the user to select the corresponding rendering manners. It can be understood that the priority set for the rendering manner options is related to the document software used for the first document, which will not be repeated here.

In S340, in response to a selection instruction for a rendering manner of the information of the second document and the information of the content block, the information of the second document and the information of the content block are rendered to the first document for display.

In the embodiment, after the first interaction area pops up in the first document, the user clicks one of the rendering manner options in the first interaction area as needed. In addition, the rendering manner option clicked by the user is highlighted to distinguish the rendering manner option selected by the user and the unselected rendering manner options. The selection instruction refers to the operation for selecting the rendering manner from the user. Exemplarily, the selection operation corresponding to the selection instruction may include: a clicking operation, a switching operation, or the like. For example, in the practical operation process, the user may switch among rendering manner options through the arrow keys (e.g., up, down, left or right) in the keyboard. Alternatively, the user may directly move the cursor on the rendering manner option to be selected by the user via the mouse and select the rendering manner corresponding to the rendering manner option by clicking the mouse.

In an embodiment, rendering the information of the second document and the information of the content block to the first document for display includes: in response to a first rendering manner being selected, rendering the information of the second document and the information of the content block in a first display mode, where in the first display mode, the information of the second document and the information of the content block are displayed in a style different from that of the content in the first document; and in response to a second rendering manner being selected, rendering the information of the second document and the information of the content block in a second display mode, where in the second display mode, the information of the second document and the information of the content block are displayed in a style the same as that of the content in the first document.

The first display mode refers to a special form used to distinguish the information of the second document and the information of the content block from the display style of the content in the first document. For example, as shown in FIG. 3, a vertical line is added to the left of the information of the content block. The second display mode refers to the display mode same as that of the first document, i.e., in the second display mode, the information of the second document and the information of the content block are in the same display style as the content in the first document.

In an embodiment, after displaying the information of the second document and the information of the content block in the first document, the method further includes: in response to a preset component triggering operation associated with the content block, acquiring and displaying information of the document into which the content block has been inserted.

The preset component triggering operation is used to acquire the information of the document associated with the content block. Apparently, the information of the document associated with the content block may be the source document of the content block or the reference document of the content block. In the practical operation process, there may be one or more reference documents for each content block, which is not limited in the present disclosure. In an embodiment, all reference documents of the content block may be acquired via a server or a local database. It can be understood that, when the application software where the first document is located is online, all reference documents of the content block in the first document may be acquired directly from the server; when the application software where the first document is located is offline, all reference documents of the content block in the first document may be acquired directly from the local database.

After acquiring the information of the document into which the content block has been inserted, the document name and document identifier of the document associated with the first document may be displayed on the interface. It is apparent that the reference documents may have the same document name in the practical operation process. The reference document identifiers may be used to distinguish the reference documents.

Figure 5:
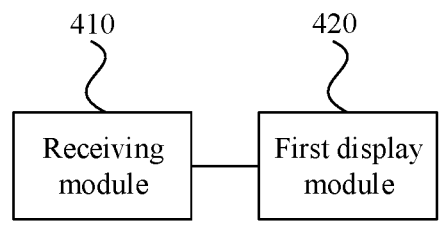
FIG. 5 is a schematic structural diagram of an document processing apparatus according to an embodiment of the present disclosure.

FIG. 5 is a schematic structural diagram of a document processing apparatus according to an embodiment of the present disclosure. This embodiment is applicable to the case where the first document displays the reference source corresponding to the content block intuitively. The document processing apparatus may be implemented by software and/or hardware. The document processing apparatus is integrated in a computer device.

As shown in FIG. 5, the document processing apparatus provided in this embodiment mainly includes: a receiving module 410 and a first display module 420.

The receiving module 410 is configured to receive, in a first document, an instruction for inserting a content block, where the content block belongs to a second document.

The first display module 420 is configured to display, in the first document, information of the second document and information of the content block, where the content block is preset by online document software, or the content block is customized by a user.

According to the embodiments of the present disclosure, the document processing apparatus is provided, which is used to perform the following operations: receiving, in a first document, an instruction for inserting a content block, where the content block belongs to a second document; and displaying, in the first document, information of the second document and information of the content block; where the content block is preset by online document software; or the content block is customized by a user. In the technical solution of this embodiment, after receiving in the first document the instruction for inserting the content block, the information of the second document and the information of the content block are displayed in the first document. In this way, the user can intuitively understand from the first document the reference relationship between the content block and the source document, to elevate the usage convenience for the user.

On the basis of the foregoing embodiments, the display module is specifically configured to display, in the content block of the first document or in the associated area of the content block of the first document, the information of the second document.

On the basis of the foregoing embodiments, the display module is specifically configured to display the information of the content block and/or the information of the second document in a first display mode.

On the basis of the foregoing embodiments, the information of the second document includes one of a title of the second document, a tag of the second document, and information of a content block in the second document.

On the basis of the foregoing embodiments, the document processing apparatus further includes:

a second display module, configured to display the second document in response to a triggering operation on the information of the content block or the information of the second document.

On the basis of the foregoing embodiments, the second display module is specifically configured to locate and display, in the second document, the information of content block or the information of the second document.

On the basis of the foregoing embodiments, the document processing apparatus further includes:

a first acquisition module, configured to acquire rendering manner options corresponding to the content block after receiving in the first document the instruction for inserting a content block; and a third display module, configured to display the rendering manner options on a first interaction area.

On the basis of the foregoing embodiments, the first display module is specifically configured to render the information of the second document and the information of the content block to the first document for display, in response to a selection instruction for a rendering manner of the information of the content block and the information of the second document.

On the basis of the foregoing embodiments, rendering the information of the second document and the information of the content block to the first document for display includes:

in response to a first rendering manner being selected, rendering the information of the second document and the information of the content block in a first display mode, where in the first display mode, the information of the second document and the information of the content block are displayed in a style different from that of the content in the first document; and in response to a second rendering manner being selected, rendering the information of the second document and the information of the content block in a second display mode, where in the second display mode, the information of the second document and the information of the content block are displayed in a style the same as that of the content in the first document.

On the basis of the foregoing embodiments, the document processing apparatus further includes:

a second acquisition module, configured to acquire and display information of the document into which the content block has been inserted, in response to a preset component triggering operation associated with the content block.

On the basis of the foregoing embodiments, the information of the document includes document name or document identifier.

According to the embodiments of the present disclosure, the above document processing apparatus can implement the method for document processing provided by the foregoing embodiments of the present disclosure, which has corresponding functional modules and beneficial effects of implementing the method for document processing.

Figure 6:
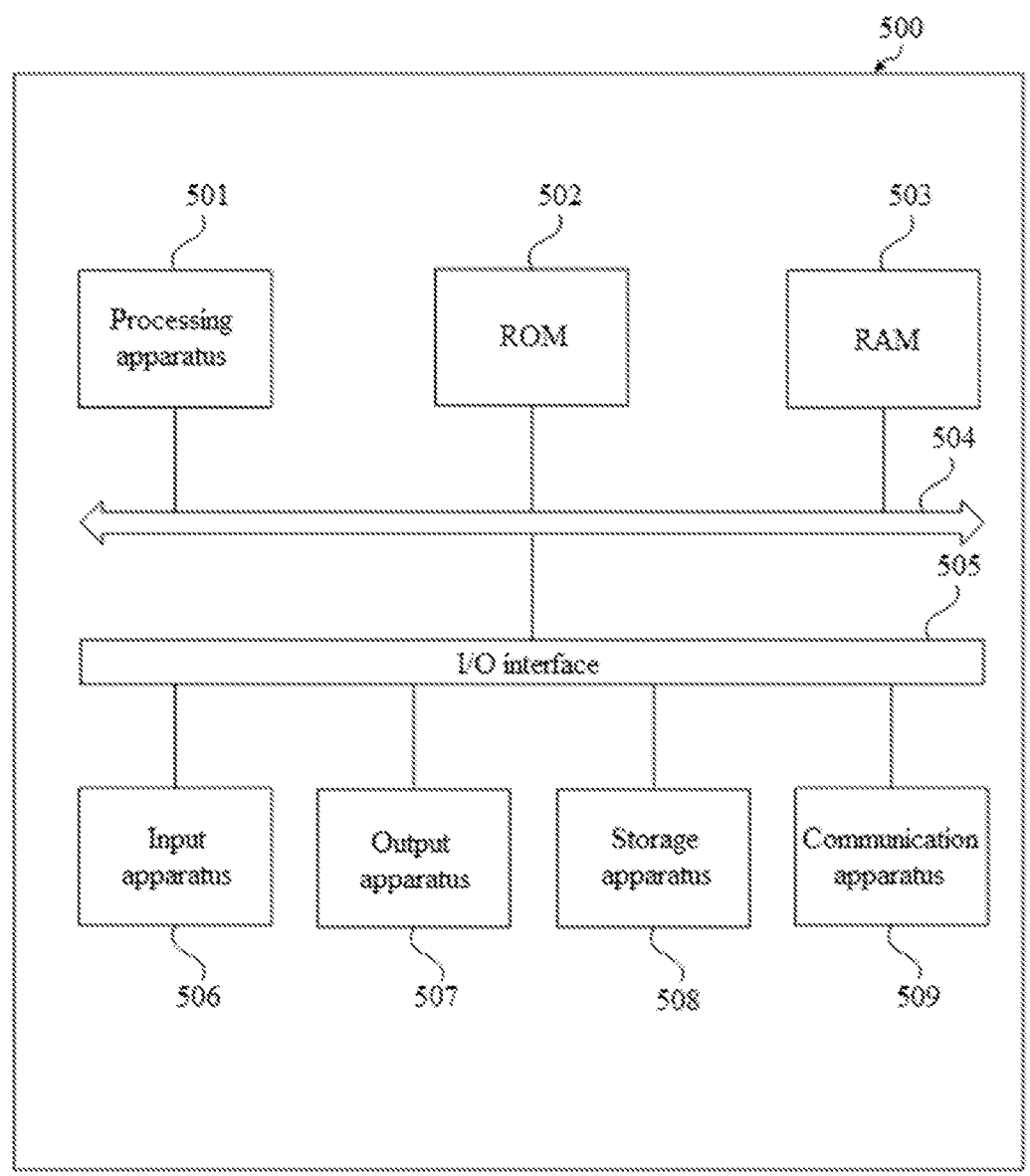
FIG. 6 is a schematic structural diagram of a document processing device according to an embodiment of the present disclosure.

FIG. 6 is a schematic structural diagram of a document processing device according to an embodiment of the present disclosure. Referring to FIG. 6 hereinafter, FIG. 6 illustrates a schematic structural diagram which is suitable for implementing the device 500 for document processing (e.g., the terminal device or server as shown in FIG. 6) according to an embodiment of the present disclosure. The terminal device in the embodiment of the present disclosure may include, but is not limited to, mobile terminals, such as mobile phones, laptops, digital broadcast receivers, personal digital assistants (PDAs), tablet computers (PADs), portable multimedia players (PMPs), vehicle-mounted terminals (such as in-vehicle navigation terminals) and the like, and stationary terminals such as digital TVs, desktop computers and the like. It should be noted that the document processing device shown in FIG. 6 is only an example and should not impose any limitations on the functions and scope of use of the embodiments of the present disclosure.

As shown in FIG. 6, the device 500 for document processing may include a processing apparatus (such as a central processor and a graphic processor) 501. The processing apparatus 501 may perform various appropriate actions and processing based on programs stored in a read-only memory (ROM) 502 or programs uploaded from a storage apparatus 505 to a random access memory (RAM) 503. Various programs and data required for operations of the device 500 for document processing are also stored in the RAM 503. The processing apparatus 501, the ROM 502 and the RAM 503 are connected to each other through the bus 504. An input/output (I/O) interface 505 is also connected to the bus 504.

Generally, the following apparatuses may be connected to the I/O interface 505: an input apparatus 506 such as a touch screen, a touch panel, a keyboard, a mouse, a camera, a microphone, an accelerometer, and gyroscope; an output apparatus 507 such as a liquid crystal display (LCD), a loudspeaker and a vibrator; a storage apparatus 508 such as a magnetic tape and a hard disk; and a communication apparatus 509. The communication apparatus 509 may allow the device 500 for document processing to communicate with other device in a wired or wireless manner to exchange data. Although FIG. 6 illustrates the device 500 for document processing provided with various apparatuses, it should be understood that not all shown apparatuses are required to be implemented or included. Alternatively, more or less apparatuses may be implemented or included.

Particularly, according to the embodiments of the present disclosure, the process described above in conjunction with flowcharts may be implemented as a computer software program. For example, a computer program product is further provided according to an embodiment of the present disclosure, including a computer program carried on a non-transitory computer readable medium. The computer program includes the program codes for implementing the methods as shown in the flowcharts. In the embodiment, the computer program may be downloaded and installed from the network via the communication apparatus 509, or installed from the storage apparatus 508, or installed from the ROM 502. When the computer program is executed by the processing apparatus 501, the functions defined in the methods according to the embodiments of the present disclosure are performed.

It should be noted that, the computer readable medium described in the present disclosure may be a computer readable signal medium, a computer readable storage medium or any combination thereof. The computer readable storage medium may include but not limited to a system, an apparatus or a device in an electric, magnetic, optical, electromagnetic, infrared or a semiconductor form, or any combination thereof. The more specific examples of the computer readable storage medium may include but not limited to electric connection of one or more wires, a portable computer magnetic disk, a hard disk, a random access memory (RAM), a read-only memory (ROM), an erasable programmable read only memory (EPROM or a flash memory), an optical fiber, a portable compact disk read only memory (CD-ROM), an optical storage device, a magnetic storage device or any appropriate combination thereof. In the present disclosure, the computer readable storage medium may be a tangible medium including or storing programs. The programs may be used by an instruction execution system, apparatus or device, or may be used in combination with the instruction execution system, apparatus or device. In the present disclosure, a computer readable signal medium may include a data signal in a baseband or propagated as a part of carrier. The computer readable signal medium carries computer readable program codes. The propagated data signal may be in a variety of forms, and include but not limited to an electromagnetic signal, an optical signal or any appropriate combination thereof. The computer readable signal medium may further be any computer readable medium other than the computer readable storage medium. The computer readable signal medium may send, propagate or transmit programs used by the instruction execution system, apparatus or device or the programs used in combination with the instruction execution system, apparatus or device. The program code embodied in the computer readable medium may be transmitted via any appropriate medium, including but not limited to an electric wire, an optical fiber, radio frequency (RF) or any appropriate combination thereof.

In some embodiments, the client and the server may perform communication by using any currently known network protocol such as Hyper Text Transfer Protocol (HTTP) or any network protocol to be developed in the further, and may connect with digital data communication (for example, a communication network) in any form or carried in any medium. Examples of the communication network include a local area network (LAN), a wide area network (WAN), Internet, and an end-to-end network (such as, ad hoc end-to-end network), and any currently known or future developed network.

The computer readable medium may be included in the document processing device above or may stand alone without being assembled into the document processing device.

The computer readable medium carries one or more programs. The one or more programs, when executed by the document processing device, cause the document processing device to:

receive, in a first document, an instruction for inserting a content block, where the content block belongs to a second document; and display, in the first document, information of the second document and information of the content block; where the content block is preset by an online document software; or the content block is customized by a user.

In an embodiment of the present disclosure, computer program codes for performing operations of the present disclosure may be written by using one or more program design language or any combination. The program design language includes but not limited to object oriented program design language such as Java, Smalltalk and C++, and further includes conventional process-type program design language such as "C" or similar program design language. The program codes may be completely or partially executed on a user computer, performed as an independent software packet, partially executed on the user computer and partially executed on a remote computer, or completely executed on the remote computer or a server. In a case of involving the remote computer, the remote computer may connect to the user computer via any type of network such as a local area network (LAN) and a wide area network (WAN). Alternatively, the remote computer may connect to an external computer (such as achieving internet connection by services provided by the internet network service provider).

The flowcharts and block diagrams in the drawings illustrate architectures, functions and operations which may be implemented by the system, method and computer program product according to the embodiments of the present disclosure. Each block in the flowcharts or the block diagram may represent a module, a program segment or part of codes including executable instruction(s) for implementing specified logic functions. It should be noted that, in some alternative implementations, the functions marked in blocks may be performed in an order different from the order shown in the drawings. For example, two blocks shown in succession may actually be executed in parallel, or sometimes may be executed in a reverse order, which depends on the functions involved. It should also be noted that each block in the block diagram and/or flow chart and a combination of the blocks in the block diagram and/or flow chart may be implemented by a dedicated hardware-based system that performs specified functions or operations, or may be realized by a combination of dedicated hardware and computer instructions.

The units mentioned in the description of the embodiments of the present disclosure may be implemented by means of software or otherwise by means of hardware. A name of the units does not constitute a limitation to the units in some case.

The functions described above herein may be at least partially performed by one or more hardware logic components. For example, the hardware logic component may include but not limited to: a field programmable gate array (FPGA), an application specific integrated circuit (ASIC), an application specific standard product (ASSP), a system on chip (SOC), a complex programmable logic device (CPLD) and so on.

It the context of the present disclosure, the machine readable medium may be a tangible medium including or storing programs. The programs may be used by an instruction execution system, apparatus or device, or may be used in combination with the instruction execution system, apparatus or device. The machine readable medium may be a machine readable signal medium or a machine readable storage medium. The machine readable medium may include but not limited to a system, an apparatus or a device in an electric, magnetic, optical, electromagnetic, infrared or a semiconductor form, or any appropriate combination thereof. The machine readable storage medium may include but not limited to electric connection of one or more wires, a portable computer magnetic disk, a hard disk, a random access memory (RAM), a read-only memory (ROM), an erasable programmable read only memory (EPROM or a flash memory), an optical fiber, a portable compact disk read only memory (CD-ROM), an optical storage device, a magnetic storage device or any appropriate combination thereof.

According to one or more embodiments of the present disclosure, a method, an apparatus, a device and a medium for document processing are provided. The method includes as follows:

receiving, in a first document, an instruction for inserting a content block, where the content block belongs to a second document; and displaying, in the first document, information of the second document and information of the content block, where the content block is preset by online document software; or the content block is customized by a user.

According to one or more embodiments of the present disclosure, a method, an apparatus, a device and a medium for document processing are provided. The displaying, in the first document, information of the second document and information of the content block includes:

displaying, in the content block of the first document or in an associated area of the content block of the first document, the information of the second document.

According to one or more embodiments of the present disclosure, a method, an apparatus, a device and a medium for document processing are provided. The displaying, in the first document, information of the second document and information of the content block includes:

displaying the information of the content block and/or the information of the second document in a first display mode.

According to one or more embodiments of the present disclosure, a method, an apparatus, a device and a medium for document processing are provided. The information of the second document includes one of a title of the second document, a tag of the second document, and information of a content block in the second document.

According to one or more embodiments of the present disclosure, a method, an apparatus, a device and a medium for document processing are provided. The method for document processing further includes:

displaying, in response to a triggering operation on the information of the content block or the information of the second document, the second document.

According to one or more embodiments of the present disclosure, a method, an apparatus, a device and a medium for document processing are provided. The displaying the second document includes:

locating and displaying, in the second document, the information of content block or the information of the second document.

According to one or more embodiments of the present disclosure, a method, an apparatus, a device and a medium for document processing are provided. After receiving in the first document the instruction for inserting a content block, the method further includes:

acquiring rendering manner options corresponding to the content block; and displaying the rendering manner options on a first interaction area.

According to one or more embodiments of the present disclosure, a method, an apparatus, a device and a medium for document processing are provided. The displaying, in the first document, the information of the second document and the information of the content block includes:

rendering, in response to a selection instruction for a rendering manner of the information of the content block and the information of the second document, the information of the second document and the information of the content block to the first document for display.

According to one or more embodiments of the present disclosure, a method, an apparatus, a device and a medium for document processing are provided. The rendering the information of the second document and the information of the content block to the first document for display includes:

rendering, in response to a first rendering manner being selected, the information of the second document and the information of the content block in a first display mode, where in the first display mode, the information of the second document and the information of the content block are displayed in a style different from that of the content in the first document; and rendering, in response to a second rendering manner being selected, the information of the second document and the information of the content block in a second display mode, wherein in the second display mode, the information of the second document and the information of the content block are displayed in a style the same as that of the content in the first document.

According to one or more embodiments of the present disclosure, a method, an apparatus, a device and a medium for document processing are provided. After displaying, in the first document, the information of the second document and the information of the content block, the method further includes:

acquiring and displaying, in response to a preset component triggering operation associated with the content block, information of the document into which the content block has been inserted.

According to one or more embodiments of the present disclosure, a method, an apparatus, a device and a medium for document processing are provided. The information of the document includes: document name or document identifier.

The above description merely illustrates the preferred embodiments of the present disclosure and the technical principles employed. Those skilled in the art should understand that the scope of present disclosure is not limited to the technical solutions formed by certain combination of the above-mentioned technical features, and should also cover other technical solutions formed by any combination of the above-mentioned technical features and any equivalent features without departing from the disclosed concept. For example, a technical solution formed by replacing the features with the technical features disclosed in the present disclosure (but not limited to) with similar functions.

In addition, although the above operations are described in a specific order, it should not be understood that these operations are required to be performed in the specific order or performed in a sequential order. In some conditions, multitasking and parallel processing may be advantageous. Similarly, although multiple implementation details are included in the above descriptions, the details should not be interpreted as limitations to the scope of the present disclosure. Some features described in the context of an individual embodiment may also be implemented in combination in an individual embodiment. Otherwise, the features described in the context of an individual embodiment may be implemented individually or in any suitable sub-combination form in multiple embodiments.

Although the subject of the present disclosure has been described according to the structural features and/or logical actions of the method, it should be understood that the subject defined in the claims is not necessarily limited to the features or actions described above. Rather, the specific features and actions described above are only examples of the implementation of the claims.

The invention claimed is:

1. A method for document processing, comprising:
   receiving, in a first document, an instruction for inserting a content block, wherein the content block belongs to a second document;
   in response to the instruction for inserting the content block:
   acquiring rendering manner options corresponding to the content block;
   displaying the rendering manner options for a user to select, on a first interaction area in the first document; and
   in response to a selection of one of the rendering manner option in the first interaction area, applying a rendering manner corresponding to the selected rendering manner option to render information of the second document and information of the content block to the first document for display,
      wherein the content block is preset by online document software, or the content block is customized by a user
      wherein the rendering manner options corresponding to the content block depend on a type or a form of the content block and vary as the type or the form of the content block varies.

2. The method for document processing according to claim 1, wherein the displaying, in the first document, the information of the second document and the information of the content block comprises:
   displaying, in a content block of the first document or in an associated area of the content block of the first document, the information of the second document.

3. The method for document processing according to claim 1, wherein the displaying, in the first document, the information of the second document and the information of the content block comprises:
   displaying the information of the content block and/or the information of the second document in a first display mode.

4. The method for document processing according to claim 1, wherein the information of the second document comprises one of a title of the second document, a tag of the second document, and information of a content block in the second document.

5. The method for document processing according to claim 1, further comprising:
   in response to a triggering operation on the information of the content block or the information of the second document, displaying the second document.

6. The method for document processing according to claim 5, wherein the displaying the second document comprises:
   in the second document, locating and displaying the information of the content block or the information of the second document.

7. The method for document processing according to claim 1, wherein the rendering the information of the second document and the information of the content block to the first document for display comprises:
   in response to a first rendering manner being selected, rendering the information of the second document and the information of the content block in a first display mode, wherein in the first display mode, the information of the second document and the information of the content block are displayed in a style different from that of the content in the first document; and in response to a second rendering manner being selected, rendering the information of the second document and the information of the content block in a second display mode, wherein in the second display mode, the information of the second document and the information of the content block are displayed in a style the same as that of the content in the first document.

8. The method for document processing according to claim 1, wherein after displaying, in the first document, the information of the second document and the information of the content block, the method further comprises:

in response to a preset component triggering operation associated with the content block, acquiring and displaying information of the document into which the content block has been inserted.

9. The method for document processing according to claim 1, wherein the information of the second document comprises: document name or document identifier.

10. A document processing device, comprising:
one or more processors; and
a memory, configured to store one or more programs;
wherein the one or more programs, when executed by the one or more processors, cause the one or more processors to implement:
receiving, in a first document, an instruction for inserting a content block, wherein the content block belongs to a second document;
in response to the instruction for inserting the content block:
acquiring rendering manner options corresponding to the content block;
popping up a first interaction area in the first document, and displaying the rendering manner options for a user to select, on the first interaction area; and
in response to a selection instruction of one of the rendering manner options in the first interaction area, applying a rendering manner corresponding to the selected rendering manner option to render information of the second document and information of the content block to the first document for display, wherein the content block is preset by online document software, or the content block is customized by a user,
wherein the rendering manner options corresponding to the content block depend on a type or a form of the content block and vary as the type or form of the content block varies.

11. The document processing device according to claim 10, wherein the one or more processors is further caused to implement:

displaying, in a content block of the first document or in an associated area of the content block of the first document, the information of the second document.

12. The document processing device according to claim 10, wherein the one or more processors is further caused to implement:

displaying the information of the content block and/or the information of the second document in a first display mode.

13. The document processing device according to claim 10, wherein the information of the second document comprises one of a title of the second document, a tag of the second document, and information of a content block in the second document.

14. The document processing device according to claim 10, wherein the one or more processors is further caused to implement:

in response to a triggering operation on the information of the content block or the information of the second document, displaying the second document.

15. The document processing device according to claim 14, wherein the one or more processors is further caused to implement:

in the second document, locating and displaying the information of the content block or the information of the second document.

16. A non-transitory computer storage medium storing a computer program thereon, wherein the computer program, when executed by a processor, implements:

receiving, in a first document, an instruction for inserting a content block, wherein the content block belongs to a second document;

in response to the instruction for inserting the content block:

acquiring rendering manner options corresponding to the content block;

popping up a first interaction area in the first document, and displaying the rendering manner options for a user to select, on the first interaction area; and in response to a selection instruction of one of the rendering manner options in the first interaction area, applying a rendering manner corresponding to the selected rendering manner option to render information of the second document and information of the content block to the first document for display, wherein the content block is preset by online document software, or the content block is customized by a user, wherein the rendering manner options corresponding to the content block depend on a type or form of the content block and vary as the type or form of the content block varies.

* * * * *